United States Patent
Sliem et al.

(10) Patent No.: US 12,523,594 B2
(45) Date of Patent: Jan. 13, 2026

(54) SENSORS FOR DETECTION OF UNDER DEPOSIT CORROSION AND METHODS OF PREPARING SAME

(71) Applicants: Qatar Foundation for Education, Science and Community Development, Doha (QA); Qatar University, Doha (QA)

(72) Inventors: Mostafa Hussien Ramadan Sliem, Doha (QA); Kamel Abdelmoniem Mohamed Eid, Doha (QA); Aboubakr Moustafa Abdullah, Doha (QA); Eman Mohamed AbdelKhalek Fayyad, Doha (QA); Nicholas John Laycock, Doha (QA); Abitha Ramesh, Doha (QA); Mohammed Maqbool Ahmed, Doha (QA); Mary P. Ryan, Doha (QA); Dhruv Arora, Doha (QA)

(73) Assignees: Qatar Foundation for Education, Science and Community Development, Doha (QA); QATAR UNIVERSITY, Doha (QA)

( * ) Notice: Subject to any disclaimer, the term of this patent is extended or adjusted under 35 U.S.C. 154(b) by 258 days.

(21) Appl. No.: 18/031,812

(22) PCT Filed: Oct. 13, 2020

(86) PCT No.: PCT/QA2020/050013
§ 371 (c)(1),
(2) Date: Apr. 13, 2023

(87) PCT Pub. No.: WO2022/081034
PCT Pub. Date: Apr. 21, 2022

(65) Prior Publication Data
US 2023/0393052 A1    Dec. 7, 2023

(51) Int. Cl.
*G01N 17/02* (2006.01)
*G01N 17/04* (2006.01)

(52) U.S. Cl.
CPC ............. *G01N 17/02* (2013.01); *G01N 17/04* (2013.01)

(58) Field of Classification Search
CPC ...... G01N 17/02; G01N 17/04; G01N 27/302; G01N 27/333
See application file for complete search history.

(56) References Cited

U.S. PATENT DOCUMENTS

2004/0118682 A1* 6/2004 Murray .............. G01N 27/3335
204/418
2004/0222093 A1* 11/2004 Tsapakh ............. G01N 27/4045
205/782

FOREIGN PATENT DOCUMENTS

CN      101530327 A  *  9/2009
JP      2018155603 A  *  10/2018

OTHER PUBLICATIONS

JP 2018155603 A, machine translation provided (Year: 2018).*
(Continued)

*Primary Examiner* — Luan V Van
*Assistant Examiner* — Randall Lee Gamble, Jr.
(74) *Attorney, Agent, or Firm* — K&L Gates LLP

(57) ABSTRACT

A novel metal-based ion-selective electrode sensor for the detection of under deposit corrosions in sour media is disclosed. The sensor can be fabricated by the sequencing electrochemical polarization followed by functionalization with an organic-inorganic layer via impregnation and polymerization. The hybrid modified multifunctional sensor allows successful selective screening and monitoring of the concertation of soluble chloride ions in sour and sweet (Continued)

media. The sensor is portable, durable, cost-effective, and feasible for practical commercial utilizations.

16 Claims, 5 Drawing Sheets

(56) References Cited

OTHER PUBLICATIONS

CN 101530327 A, machine translation provided (Year: 2009).*
Jin et al. Investigation on the performance characteristics of chloride selective electrode in concrete. Ionics, 2015; 21, pp. 2981-2922 (Year: 2015).*
Golabi and Mohammadi. Wire-Coated Silver(I) Ion-Selective Electrode Based on 2-Mercaptobenzothiazole (MBT) Ionophore: Application to the Determination of Silver in Real Samples. Analytical Sciences. 2003; 19, 877-881 (Year: 2003).*
Moussy and Harrison. Prevention of the Rapid Degradation of Subcutaneously Implanted Ag/AgCl Reference Electrodes Using Polymer Coatings. Anal. Chem. 1994; 66, 674-679 (Year: 1994).*
Zribi. Detection of Nitrate/Nitrite Using BDD Electrodes Coated with Metal Nano-Catalysts. MDPI Proceedings 2017; 1 (452), 1-4) (Year: 2017).*
Chou. Fabrication and Application of Ruthenium-Doped Titanium Dioxide Films as Electrode Material for Ion-Sensitive Extended-Gate FETs. IEEE Sensors Journal 2009; 9(3), 277-284 (Year: 2009).*
International Search Report for related International Application No. PCT/QA2020/050013; action dated Apr. 21, 2022; (2 pages).
Written Opinion for related International Application No. PCT/QA2020/050013; action dated Apr. 21, 2022; (5 pages).

* cited by examiner

SENSORS FOR DETECTION OF UNDER DEPOSIT CORROSION AND METHODS OF PREPARING SAME

CROSS-REFERENCE TO RELATED APPLICATIONS

This application is a National Stage filing under 35 U.S.C. 371 of International Application No. PCT/QA2020/050013, filed on Oct. 13, 2020, the entire contents of which is hereby incorporated by reference and relied upon.

BACKGROUND

Pipelines in oil and gas industry get damaged from corrosion for ages, which not only results in gradual loss of materials but also causes a huge economic loss and environmental failures [1-5]. Failure of pipelines due to under deposit corrosion (UDC) is a major threat in the oil and gas industry and transportation facilities [3, 4]. The mechanism of UDC based on the area of the metal beneath the deposit is anodically coupled to other uncovered areas which are considered as external cathodes. Herein, the driving force for galvanic corrosion is owed to the different chemistries inside and outside the deposits. The ions transfer of corrosive species and byproducts through the deposit layer are a reference of UDC. Therefore, it will be expected that pH and chloride concentration in covered areas is unequaled that in uncovered areas if the corrosion rate is controlled by diffusion of the reactants [5, 6]. There are several types of ion selective electrodes for measuring chloride concentrations [7-10]. However, a sensor able to accurately detect the chloride concentration under several types of deposits have not been developed. There are debates about the phenomena of the chloride ions attack at UDC: Whether the diminution of the corrosion rate after the formation of the deposited layer resulting from the reduction of the chloride ion concentration on the steel surface or it is just a counterfeit trend of the whole surface and the chloride ions create severe anodic areas below the deposited layer [11, 12].

SUMMARY

The present disclosure provides methods of fabricating a stable chloride ion selective electrode which is highly sensitive in the absence and the presence of different deposits at miscellaneous environments. Particularly, the present disclosure provides smart design of scalable modified autoprogramed silver-electrode as an efficient sensor for online monitoring chloride ion under deposit corrosion in sour media.

According to one non-limiting aspect of the present disclosure, an example embodiment of a sensor may comprise an Ag/AgCl electrode with a polarized surface. The polarized surface may comprise a coating comprising a composite organic-inorganic compound. The polarized surface may further comprise at least one of a polymeric material or a ceramic material. The sensor may comprise AgCl particles on the polarized surface. The AgCl particles on the polarized surface may have a mean diameter of about 100 nm. The sensor may comprise hierarchical pores between the AgCl particles on the polarized surface.

According to another non-limiting aspect of the present disclosure, an example embodiment of a method of preparing the sensor may comprise subjecting an Ag wire to sequencing electrochemical polarization followed by functionalization with an organic-inorganic layer via impregnation and polymerization. The method may comprise at least one step selected from the group consisting of degreasing the Ag wire with acetone; washing the Ag wire with deionized water; mounting the Ag wire in a flexible Teflon tube; filling the tube with epoxy resin; providing a chloride free electrode as a reference electrode; or providing a platinum wire as a counter electrode in potentiodynamic polarization. The reference electrode may comprise Mercury/Mercurous sulfate ($Hg/Hg_2SO_4$).

According to another non-limiting aspect of the present disclosure, an example embodiment of a use may comprise using the sensor to detect ions. The sensor may be used to detect ions selected from the group consisting of $Cl^-$, $NO_3CO_3^{-2}$, $PO_4^{-3}$, $CH_3COO^-$, $SO_4^{-2}$, $ClO_4^-$, and combinations thereof. The sensor may be used to monitor under deposit corrosion. The under deposit corrosion may be caused by a deposit selected from the group consisting of FeS, FeS2, SiO2, and combinations thereof. The sensor may be used to detect chloride ions in sour and/or sweet media. The chloride ions may be detected in a concentration ranging from about 0.0001 M to about 1 M. The sensor potential may decrease systematically with an increasing chloride concentration. The sensor may be used under a temperature in a range of about 10-300° C. The sensor may be used under a pressure in a range of about 10-40 bar.

Additional features and advantages are described herein, and will be apparent from the following Detailed Description and the figures.

BRIEF DESCRIPTION OF THE DRAWINGS

Features and advantages of the sensors for detection of under deposit corrosion and methods of preparing same described herein may be better understood by reference to the accompanying drawings in which.

Figure 1:
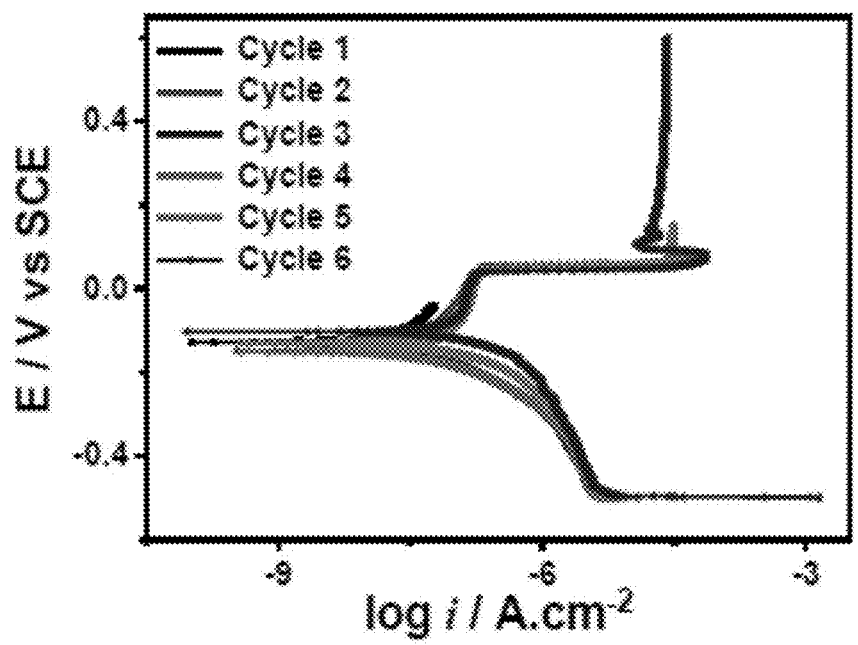
FIG. 1 shows the potentiodynamic polarization of Ag electrode in 9 g/L NaCl solution. The anodic potentials were terminated at different potentials of cycles (1) −40, (2) 40, (3) 60, (4), 80 (5) 150, and (6) 600 mV.

The reader will appreciate the foregoing details, as well as others, upon considering the following detailed description of the sensors for detection of under deposit corrosion and methods of preparing same according to the present disclosure. The reader may also comprehend certain of such additional details upon using the sensors for detection of under deposit corrosion and methods of preparing same described herein.

DETAILED DESCRIPTION

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

In the Oil/gas industries, the corrosion is the dominant factor behind the failures and leaks in pipelines or tanks as well as the breaking of metal-bridges or water pipelines in the infrastructures sectors, which can lead to a nearly 20-30% loss in the production in the oil/gas industries only. The underdeposit corrosion and/or chloride-induced corrosion are of the most dangerous types of corrosion, which both account over 90% of the corrosion, which causes the corrosion rate of 300 mm/yr resulting in a kind of regular intolerable maintenance and corrosion management cost annually. Particularly, globally, the annual cost of corrosion reached 2.5 trillion USD that is about 3.5% of the global gross domestic product (GDP), without considering the individual safety or environmental consequences. More than 1.372 trillion USD of them are for the corrosion in the oil and gas production industry. In the oil/gas industries, the cost of corrosion reached over 1 trillion, 15 billion, and 40 billion USD in UK, Qatar, and USA in the last 10 years in addition 6.43-10.15 billion/year in USA for the corrosion of the highway bridges.

The corrosion promoted various catastrophic infrastructure failures, economic loss, and people death or injuries globally. For instance, underground pipeline explosion in the China and Taiwan, caused 62 and 32 deaths, respectively beside over 400 critical injuries and over 3 billion loss in production. Likewise, the well blowout in BP at Macondo led to at least 11 deaths, spilling of nearly 3.19 million barrels of crude oil into the Gulf of Mexico, 30 billion USD penalties and maintenance. In USA, there are around 240,000 water main breaks annually cost around $20 billion for infrastructure. The corrosion is responsible for about 8000/year corrosion leaks, 1600/year spills, and with overall 28.5% of the accidents during transition of oil/gas pipelines. Interestingly enough, 34% of such accidents were due to the internal or under deposit corrosion. These amounts are expected to increase significantly in the near future, due to the ceaseless attempts to increase the production rate as well as the global climate changes. Thus, the early detection of the under deposit corrosion can save unlimited billions of USD every year, save people life, property damages, and so on.

Ag/AgCl-based sensors are commonly used as reference electrodes in many electrochemical applications as well for the potentiometric detection of various ions; however, their utilization in the detection of chloride ions in sour media was never reported and still impractical. This was due to the massive ion interference, results in a non-linear relationship between the concentration of chloride ions and its potentiometric response (Non Nernst behavior).

The present invention provides a modified silver-based electrode as a sensitive, selective, and durable sensor for under deposit and bulk chloride ions in sour media. The modified Ag/AgCl electrode may include novel-organic-inorganic 2-Mercaptobenzothiazole composites for precluding the ion interferences, allowing selective ion detection and potentiometric responses close to the Nernstian behavior. A sensor using this modified Ag/AgCl electrode is efficient, durable, cost-effective, and portable for the prompt detection of under deposit and bulk chloride ions in sour media feasible for the oil and gas industries.

The present invention also provides a fabrication process for this sensor, which has various advantages over existing sensors. The present process couples the unique merits of cyclic potentiodynamic polarization approach, i.e., simplicity, versatility, formation of spontaneous thick AgCl layer, productivity, and produce highly corrosion-resistant sensor with rough surface, with the inimitable properties of impregnation and polymerization approaches, i.e. quick formation of stable layer, averting ion interference, achieving a quick reversible equilibrium in sour media, and inferior electrochemical noise.

The surface features, including porosity, roughness, and adhesion of the Ag-based sensor of the present invention can be tuned via changing the potentials; and meanwhile, the accuracy and selectivity for ion detection can be easily controlled via the Ag—Cl-Nafion-2-Mercaptobenzothiazole layer.

The sensor of the present invention is highly cost-effective and can cost less than about $1 USD; is portable and can be, for example, in a solid form; is thermally-stable, for example, up to about 150° C.; is thermally conductive and can have a thermal conductivity of, for example, about 4.29 W/cm/K @ 298.2 K; is durable mechanically and can have a hardness up to, for example, about 251 MPa and a Young's Modulus up to, for example, about 83 GPa); is stable chemically and can be insoluble in water or other organic media; and is selective for detection of chloride ions under deposit corrosion in sour media.

The sensor of the present invention can allow sensitive detection of chloride ions with a detection limit ranging from about 0.0001 to about 1 M as a function of potential whilst eliminating the interfering of sulfide and hydrogen sulfide ions with a Nernstian slope of 50 mV/decade that is almost analogous to and/or close to the Nernst behavior.

Distinct from any previously developed and/or commercially available Ag/AgCl electrode, the sensor of the present invention can be modified and auto-programed for prompt and selective monitoring of the under deposit chloride ion concentration in sour and sweet media under high temperatures and pressures.

The modified silver-based sensor of the present invention may be used in and/or as a pH sensor used in sour media. It can also be used in a multi-electrode system that can be used a sensor for multifunctional detection of other ions and/or for monitoring temperature as well.

The sensor of the present invention can be used under elevated temperatures, and under high pressures. The temperature can be in the range of about 10-300° C. and/or any subrange therein, for example, from about 10-100° C., about 100-300° C., about 200-300° C., about 10-50° C., about 50-100° C., about 100-150° C., about 150-200° C., about 200-250° C., about 250-300° C., etc. The pressure can be in the range of about 10-40 bar and/or any subrange therein, for example, from about 10-20 bar, about 20-30 bar, about 30-40 bar, about 10-15 bar, about 15-20 bar, about 20-25 bar, about 25-30 bar, about 30-35 bar, about 35-40 bar, etc.

The sensor of the present invention can include a modified organic-inorganic layer on the surface. This modified organic-inorganic layer can be further blended or capped with other polymeric or ceramic materials or organic materials for enhancing the selectivity and durability for the detection of other ions, such as $NO_3^-$, $CO_3^{-2}$, $PO_4^{-3}$, $CH_3COO^-$, $SO_4^{-2}$, and $ClO_4^-$. The polymeric or ceramic materials or organic materials that can be used may include, for example, cellulose acetate, cellulose nitrate, polyurethane, polyvinyl chloride, and poly(dimethoxysiloxane) or metal oxides $RuO_2$, $TiO_2$, $IrO_x$, $Al_2O_3$ and $SnO_2$.

The silver-based sensor can include and/or use other metals that are sensitive to the detection of chloride ions. Such materials can be Ru and/or Sn. Doping the silver-based sensor with other metals, such as Ru and/or Sn, can enhance the sensitivity as well as durability under high pressures and/or temperatures.

The sensor of the present invention can be used for monitoring chloride ions in different media.

The sensor of the present invention can be used for monitoring different types of under deposit corrosion.

The sensor of the present invention can be used on an Ag-based sensor made by other approaches, such as sputtering, screen printing, electrochemical anodization, and/or chemical deposition.

The sensor of the present invention can be used for detection of the under deposit corrosion based on the detection of other non-metal ions, such as hydrogen, and/or iron.

The sensor of the present invention can be used for efficient, selective, and/or prompt online detection of under deposit corrosion as a function of potentiometric responses to chloride ions in sour and sweet media. The sensor of the present invention can be widely used in the oil and gas industry.

There is always build up of chloride ion concertation during under deposit corrosion. The sensor of the present invention can allow selective detection of the under deposit chloride ion concentration in sour and/or sweet media.

The sensor of the present invention is highly accurate and can be almost and/or about 100% accurate for selective detection of chloride ions in different media.

The sensor of the present invention can work under any conditions in reality, such as under high temperatures and/or high pressures, and/or in different media.

The sensor of the present invention can be portable, durable, highly cost-effective (e.g., nearly 1 USD), and feasible for practical commercial utilizations.

The sensor of the present invention can be easily handled, modified, stored, and can be easily synthesized from inexpensive and earth abundant materials without the need for sophisticated laboratory equipment.

The sensor can detect the chloride in a concentration ranging from about 0.0001 M to about 1 M.

EXAMPLES

Materials

Silver wire with 0.5 mm diameter and 50 mm length was provided by Advent Co., Ltd, UK. The wire was degreased with acetone and washed with deionized water. Next, it was mounted in a flexible Teflon tube, and the tube was filled with epoxy resin to prevent ingress of test solutions into the Teflon tube. Mercury/Mercurous sulfate ($Hg/Hg_2SO_4$) was utilized as a reference electrode in all electrochemical measurements, where a chloride free electrode is required. A platinum wire was used as a counter electrode in the potentiodynamic polarization test.

NaCl solutions with different chloride concentrations (0.1, 0.5, 1, 3M) were applied to three primary standard solutions to maintain the pH (4, 7, and 10); where 0.05 M potassium hydrogen phthalate was prepared at pH 4. 0.025 M disodium hydrogen phosphate with 0.025 M potassium dihydrogen phosphate were prepared at pH 7. Additionally, 0.025 M sodium hydrogen carbonate and 0.025 M sodium carbonate were prepared at pH 10. Moreover, the ionic strength value was adjust using sodium sulfate anhydrous, and the pH values of the solutions were verified using a JENWAY pH meter.

Deposit Characterization

Three different deposits iron sulfide (FeS), iron disulfide (FeS2) and sand mesh with 100 μm ($SiO_2$) were utilized to imitate the deposits formed in the pipeline for the detection of the chloride ions penetration. For the deposit application, 0.3 mg of the required material was dispersed in a solution of 0.6 mL isopropyl alcohol and 0.4 mL Nafion (5 wt %), and the solution was sonicated for 2 h. Secondly, 100 μL of the dispersion deposit was casted onto the Ag/AgCl surface, which was allowed to dry for 2 h. Then, the prepared electrode was heated at 80° C. for 4 h to obtain a compact layer of deposit.

Surface Analysis

The surface morphology of the Ag/AgCl electrode and deposits structure before and after Nafion polymerization were examined with a field emission scanning electron microscope (FE-SEM, FE-SEM-Nova Nano-450, Netherland) coupled with an energy dispersive X-ray (EDX) units.

Ag/AgCl Reference Electrode Fabrication

FIG. 1 shows the current-potential curve obtained from the potentiodynamic polarization test. The potentiodynamic anodic and cathodic polarization plots were attained from −500 mV versus open circuit potential (OCP) at a scan rate 0.167 mV $s^{-1}$ and the anodic polarization potential was terminated at different value such as (−40, 40, 60, 80, 150 and 600 mV) versus OCP in a series of a sequenced cycles as indicated in the figure. Unexpectedly and surprisingly, the formation of Ag/AgCl layer can be noticed from shifting the corrosion current and cathodic slop to the positive direction as proof of increasing of the surface area of the electrode. The Ag/AgCl surface at anodic potential of 60 mV on cycle 3 had a 50 μA $cm^{-2}$ corrosion current density. Meanwhile, for cycle 6 for 600 mV as a higher anodic overpotentials, the current density did not increase, but stayed at the higher magnitude on the order of the anodic current density as it reached 98 μA $cm^{-2}$.

The polarized Ag/AgCl surface was immersed in deionized water for 24 h with stirring. Then, it was covered with 10 μL of 2-Mercaptobenzothiazole with 2% Nafion as a composite and heated for 8 h at 80° C. The protective layer can act as a membrane salt equilibrium especially for various concentrations of chloride [13]. This step was repeated three times. The membrane porosity, conductivity, water uptake, and the chloride ion mobility were investigated by Lehmani et al. [13]

SEM Analysis

Figure 2A:
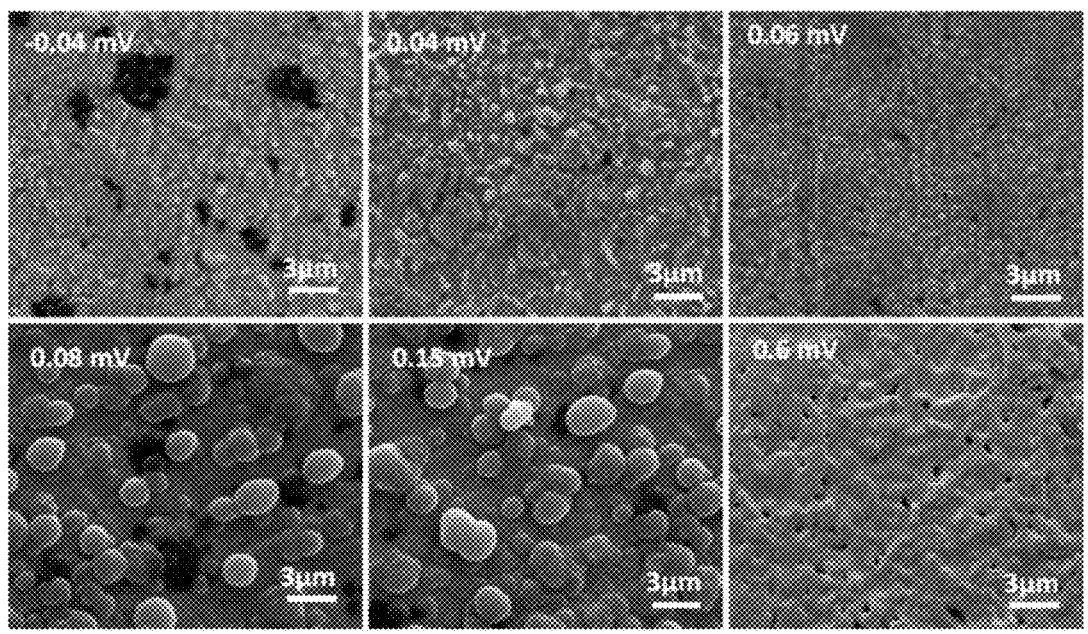
FIG. 2A shows the SEM images of Ag electrode in 0.9 wt. % NaCl solution after different anodic potentials end.
Figure 2B:
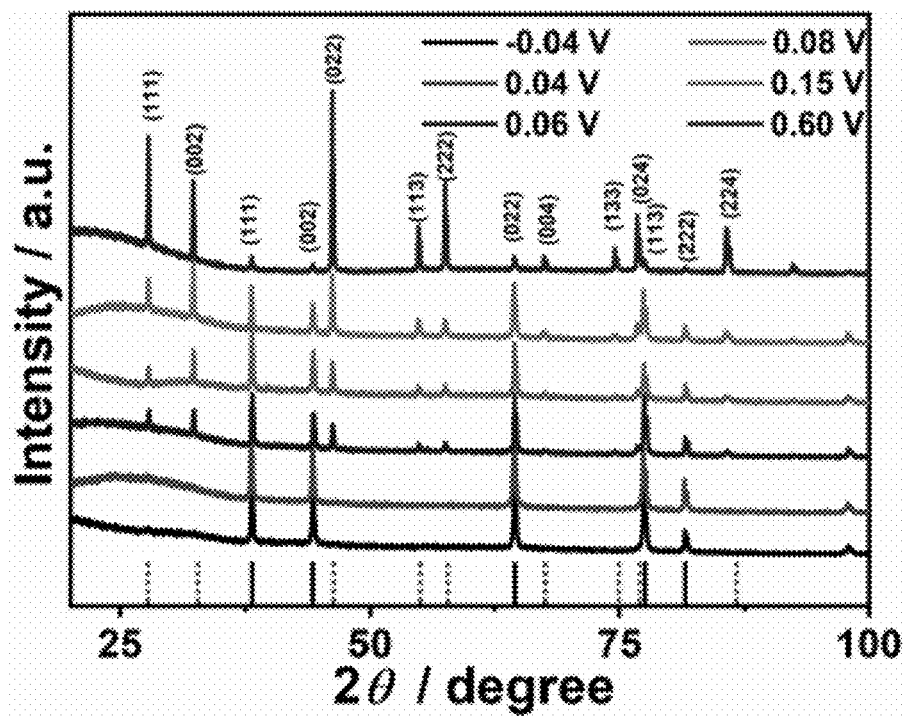
FIG. 2B shows the wide-angle XRD diffraction patterns of typically synthesized AgCl obtained from the ICSD database, the indicated solid lines for Ag (ICSD:64706) and the dotted lines for AgCl (ICSD:64734).

FIG. 2a shows the SEM micrographs of the Ag/AgCl electrode surface topography after different cycles of potentiodynamic polarization. FIG. 2a depicts the Ag/AgCl surface at a terminated anodic potential of 60 mV. Interestingly, the polarized sample was covered with patches of non-continuous corrosion product film with AgCl particles with a mean size/diameter of about 100 nm. Also, some hierarchical pores (d≤1.5 μm) began to appear between the particles. FIG. 2b shows the effect of increasing the anodic polarization potential to 600 mV. The specimen surface after polarization gives a continuous patches layer which is expanded laterally to cover the silver substrate. Surprisingly, the micropores were randomly distributed on the activated surface with a myriad number of pore sizes ranging from 500 nm to 1 μm.

Deposit Characterization

Figure 3:
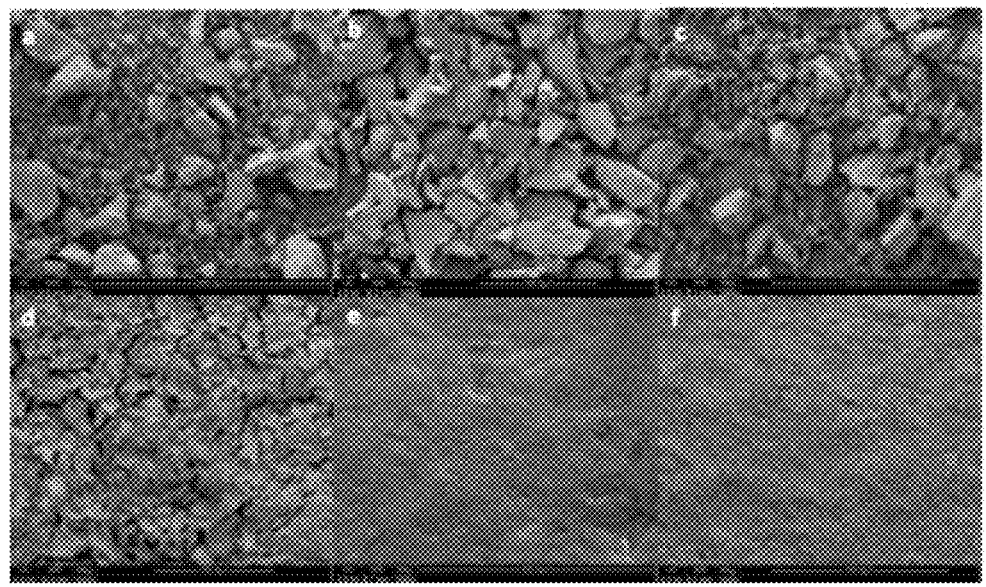
FIG. 3 show the SEM images of different deposits materials in the absence and the presence of Nafion content (a, d) FeS, (b, e) FeS2 and (c, f) SiO2.

FIG. 3 illustrates the change in the structure for the different deposits after adding the deposit materials to 2%

Nafion solution. Images a-c show the morphology of the different deposit types as the three deposits possess a various irregularity on its particle sizes where FeS, FeS$_2$ and SiO$_2$ have an average particle size around 31, 42 and 27 μm, respectively. However, the morphology was completely changed after sonication and drop casting with Nafion. Image d shows the FeS deposit layer with Nafion interaction, and a noticeable crack can be observed. On the other hand, a compact layer without any defect on FeS$_2$ deposit can be seen in image e. Moreover, micropores are present the in SiO$_2$ casted layer as shown in image f.

The following Table 1 presents the physical properties for the different types of deposits. As shown in the table, the electrical conductivity results for the different deposits match the impedance spectroscopic analysis as the conductivity is in the order of FeS$_2$>FeS>SiO$_2$. Furthermore, the results of the deposit materials' pore sizes and pore volumes show that the three deposits do not have pores in their structures, and their surface areas are in ranges which match the deposits formed on the pipelines.

TABLE 1 physical properties for different types of deposits

| Material | Resistance, (MΩ) | Conductivity, (σ) ×10$^{-6}$ | Pore volume, (cc/g) ×10$^{-3}$ | Pore size, (A) |
|---|---|---|---|---|
| FeS | 18.41 | 54.31 | 12.44 | 37.1 |
| FeS$_2$ | 0.0981 | 0.113 | 9.84 | 126.7 |
| SiO2 | 1840 | 0.005 | 20.23 | 31.8 |

Chloride Ions Detection

Ag/AgCl electrodes are commonly utilized for chloride ions sensing due to their low solubility in aqueous solutions. The interfacial potential of Ag/AgCl depend on the Nernst law:

$$E_{Ag/AgCl} = E_o + 0.059 \log(Cl^-),$$

wherein EAg/AgCl is the Ag/AgCl potential versus the reference electrode; Eo is the standard equilibrium potential at room temperature; and Cl$^-$ is the chloride concentration at a constant ionic strength.

Figure 4:
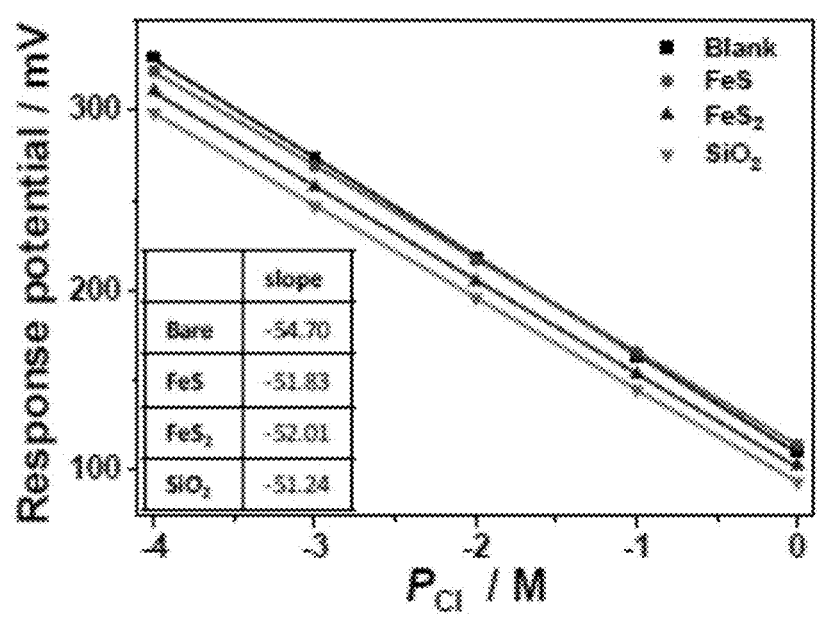
FIG. 4 is the potential response curve for the Ag/AgCl electrode without and with different deposits at pH 4 at different Cl Concentrations.
Figure 5:
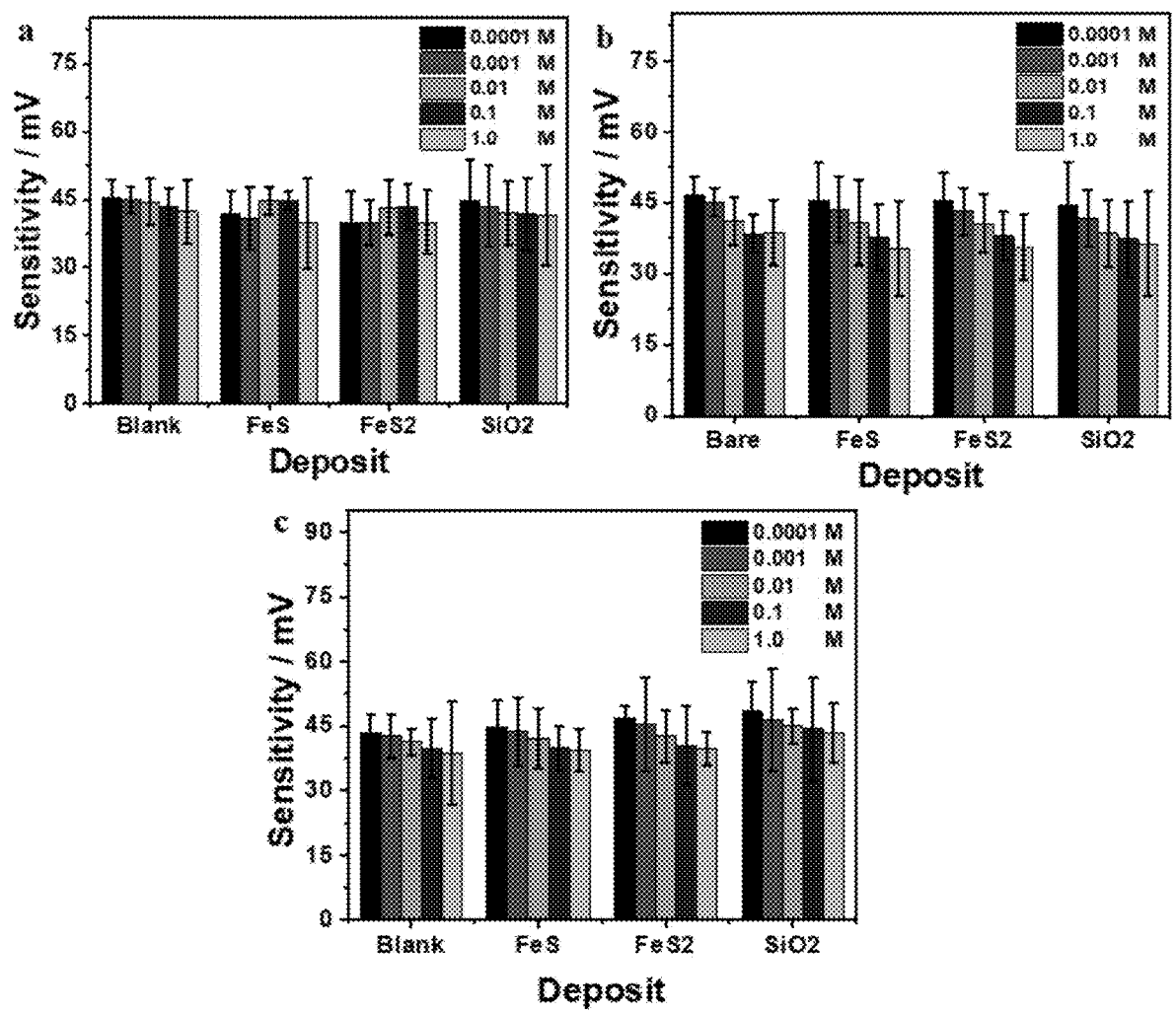
FIG. 5 shows the sensitivity of the Ag/AgCl electrode for various concentrations of Cl ions in the absence and the presence of different deposits including FeS, FeS2, and $SiO_2$ under different pH values of (4, 7, and 10).

The potential of the chloride sensors (four-time repeatability) was measured for different chloride contents in three different primary standard solutions with a constant ionic strength value as presented in FIG. 4. It is distinguishable that the sensor potential decreases systematically with the increasing chloride concentration. Additionally, the chloride response gives a remarkable deviation between different deposits based on the structure of and the pores on the deposited layer. FIG. 5 displays the sensitivity of the Ag/AgCl electrode for various concentrations of Cl ions in the absence and the presence of different deposits including FeS, FeS z, and SiO$_2$ under different pH values of (4, 7, and 10).

Figure 6:
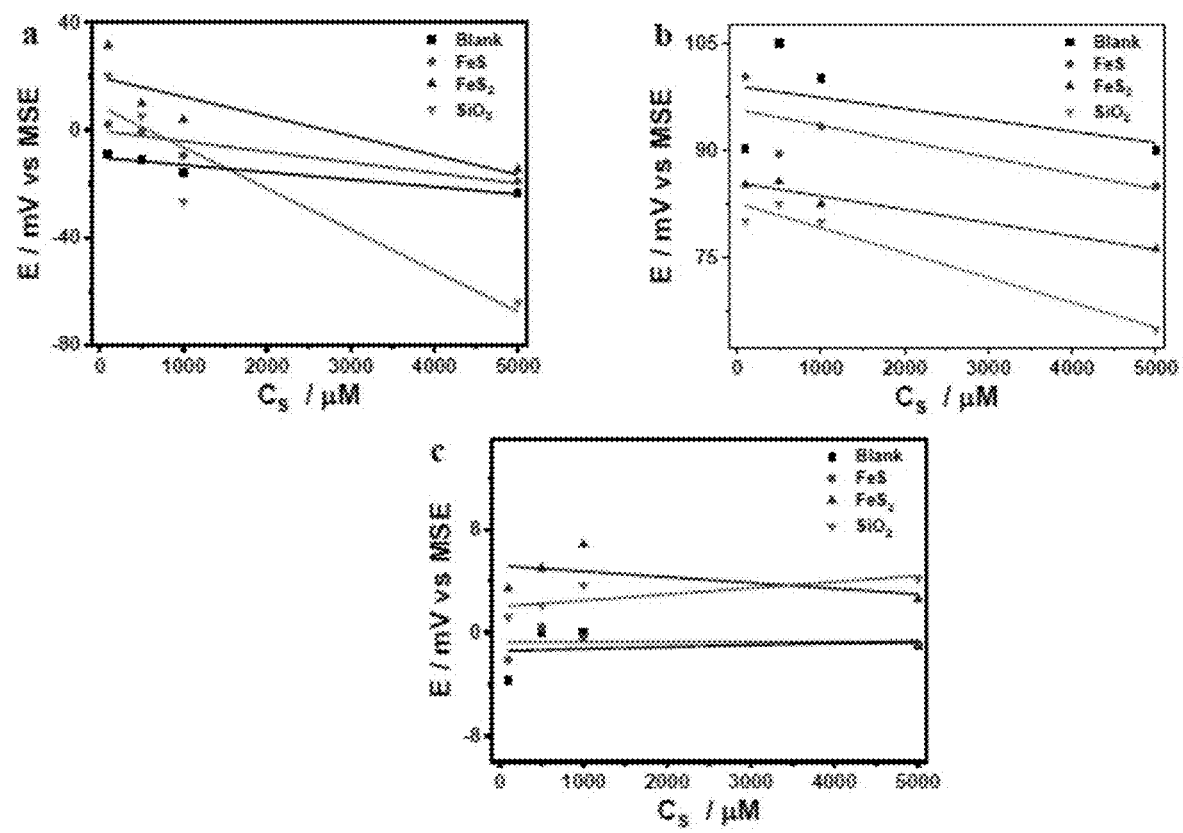
FIG. 6 shows the calibration curves of the Ag/AgCl electrode without and with different deposits at different pH and S-2 Concentrations at (a) pH4, (b) pH7, and (c) pH10.

FIG. 6 shows the calibration curves obtained from the open circuit potential for the prepared Ag/AgCl sensor at three different standard solutions, i.e., with a pH of 4, 7, and 10 respectively, with 0.5 M NaCl in the absence and presence of various sulfur contents at room temperature. The Ag/AgCl sensor gives zero or nearly zero potential response during the presence of any concentration of the sulfur ions.

SUMMARY

Therefore, the present invention provides a newly developed chloride sensor and methods of fabrication of such a sensor, wherein the sensor may include an electrochemically prepared Ag/AgCl electrode. Nafion can be utilized for protection, ion carrier, and deposit preservative. The electrode surface may include micropores, which are responsible for the chloride ion selectivity, and these micropores can be randomly distributed on the electrode surface with different pore sizes. The deposited FeS layer shows cracks, and these cracks can increase the Cl$^-$ permeability at the different environment. Furthermore, the FeS2 compact layer can reduce the Cl$^-$ response. Meanwhile, the micropores in the SiO$_2$ tasted layer has an effect on the Cl$^-$ sensing.

As used in this detailed description and the appended claims, the singular forms "a," "an" and "the" include plural referents unless the context clearly dictates otherwise. For example, reference to "an ingredient" or "a method" includes a plurality of such "ingredients" or "methods." The term "and/or" used in the context of "X and/or Y" should be interpreted as "X," or "Y," or "X and Y." Similarly, "at least one of X or Y" should be interpreted as "X," or "Y," or "both X and Y." Similarly, the words "comprise," "comprises," and "comprising" are to be interpreted inclusively rather than exclusively. Likewise, the terms "include," "including" and "or" should all be construed to be inclusive, unless such a construction is clearly prohibited from the context. However, the embodiments provided by the present disclosure may lack any element that is not specifically disclosed herein. Thus, a disclosure of an embodiment defined using the term "comprising" is also a disclosure of embodiments "consisting essentially of" and "consisting of" the disclosed components. "Consisting essentially of" means that the embodiment or component thereof comprises more than 50 wt. % of the individually identified components, preferably at least 75 wt. % of the individually identified components, more preferably at least 85 wt. % of the individually identified components, most preferably at least 95 wt. % of the individually identified components, for example at least 99 wt. % of the individually identified components.

All ranges described are intended to include all numbers, whole or fractions, contained within the said range. As used herein, "about," "approximately" and "substantially" are understood to refer to numbers in a range of numerals, for example the range of −10% to ±10% of the referenced number, preferably −5% to +5% of the referenced number, more preferably −1% to ±1% of the referenced number, most preferably −0.1% to +0.1% of the referenced number. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth. As used herein, wt. % refers to the weight of a particular component relative to total weight of the referenced composition.

REFERENCES

[1] A. Herrin, J. M. de la Cruz, B. de Andrés, Global Search Metaheuristics for planning transportation of multiple petroleum products in a multi-pipeline system, Computers & Chemical Engineering 37 (2012) 248-261.

[2] A. Bahgat Radwan, M. H. Sliem, P. C. Okonkwo, M. F. Shibl, A. M. Abdullah, Corrosion inhibition of API X120 steel in a highly aggressive medium using stearamidopropyl dimethylamine, Journal of Molecular Liquids 236 (2017) 220-231.

[3] R. Z. Rios-Mercado, C. Borraz-Sanchez, Optimization problems in natural gas transportation systems: A state-of-the-art review, Applied Energy 147 (2015) 536-555.

[4] P. C. Okonkwo, M. H. Sliem, RA. Shakoor, A. M. A. Mohamed, A. M. Abdullah, Effect of Temperature on the Corrosion Behavior of API X120 Pipeline Steel in H2S Environment, Journal of Materials Engineering and Performance 26 (2017) 3775-3783.

[5] A. Shakoor, K. Shahzad, M. H. R. Sliem, F. Ubaid, H. M. Akbar, A. M. Abdullah, R Kahraman, F. M. Montemor, U. Manzoor, Corrosion behavior of high strength low alloy HSLA steel in 35 wt % NaCl solution containing diethylenetriamine DETA as corrosion inhibitor, Qatar Foundation Annual Research Conference Proceedings 2018 (2018) EEPD356.

[6] J. Huang, B. Brown, X. Jiang, B. Kinsella, S. Nesic, Internal CO2 corrosion of mild steel pipelines under inert solid deposits, CORROSION 2010 (2010).

[7] B. Elsener, L. Zimmermann, H. Bohni, Non destructive determination of the free chloride content in cement based materials, Materials and Corrosion 54 (2003) 440-446.

[8] A. Cranny, N. R. Harris, M. Nie, J. A. Wharton, R. J. K. Wood, K. R. Stokes, Screen-printed potentiometric Ag/AgCl chloride sensors: Lifetime performance and their use in soil salt measurements, Sensors and Actuators A: Physical 169 (2011) 288-294.

[9] M. Glanc-Gostkiewicz, M. Sophocleous, J. K. Atkinson, E. Garcia-Breijo, Performance of Miniaturised Thick-Film Solid State pH Sensors, Procedia Engineering 47 (2012) 1299-1302.

[10] J. Chou, T. Tseng, Y. Liao, C. Lai, S. Yan, Y. Wu, C. Wu, S. Lin, Analysis of Chloride Ion Sensor Modified by Graphene Oxide under Microfluid Flow, IEEE Sensors Journal (2019) 1-1.

[11] Q. Y. Liu, L. J. Mao, S. W. Zhou, Effects of chloride content on CO2 corrosion of carbon steel in simulated oil and gas well environments, Corrosion Science 84 (2014) 165-171.

[12] H. De Reus, L. J. A. Hendriksen, M. Wilms, Y. N. Al-Habsi, W. Durnie, M. Gough, Test Methodologies and Field Verification of Corrosion Inhibitors to Address under Deposit Corrosion in Oil and Gas Production Systems, CORROSION 2005, NACE International, Houston, Texas, 2005, pp. 24.

[13] A. Lehmani, P. Turq, M. Périé, J. Périé, J.-P. Simonin, Ion transport in Nafion® 117 membrane, Journal of Electroanalytical Chemistry 428 (1997) 81-89.

The invention claimed is:

1. A sensor comprising an Ag/AgCl electrode with a polarized surface, wherein the polarized surface comprises a coating comprising a composite organic-inorganic compound, wherein the composite organic-inorganic compound comprises 2-Mercaptobenzothiazole and a copolymer of perfluoro-3,6-dioxa-4-methyl-7octene-sulfonic acid and tetrafluoroethylene, wherein the polarized surface is blended or capped with one of cellulose acetate, cellulose nitrate, polyurethane, polyvinyl chloride, poly(dimethoxysiloxane) or metal oxides of $RuO_2$, $TiO_2$, $IrO_x$, $Al_2O_3$, or $SnO_2$, and wherein the sensor is doped with Ru or Sn.

2. The sensor of claim 1, wherein the polarized surface further comprises at least one of a polymeric material or a ceramic material.

3. The sensor of claim 1 comprising AgCl particles on the polarized surface.

4. The sensor of claim 3, wherein the AgCl particles on the polarized surface have a mean diameter of about 100 nm.

5. The sensor of claim 3 comprising micropores between the AgCl particles on the polarized surface.

6. A method of preparing a sensor comprising an Ag/AgCl electrode with a polarized surface, wherein the polarized surface comprises a coating comprising a composite organic-inorganic compound, and wherein the composite organic-inorganic compound comprises 2-Mercaptobenzothiazole and a copolymer of perfluoro-3,6-dioxa-4-methyl-7octene-sulfonic acid and tetrafluoroethylene, wherein the polarized surface is blended or capped with one of cellulose acetate, cellulose nitrate, polyurethane, polyvinyl chloride, poly(dimethoxysiloxane) or metal oxides of $RuO_2$, $TiO_2$, $IrO_x$, $Al_2O_3$, or $SnO_2$, and wherein the sensor is doped with Ru or Sn, the method comprising:

subjecting an Ag wire to sequencing electrochemical polarization followed by functionalization with an organic-inorganic layer via impregnation and polymerization.

7. The method of claim 6 comprising at least one step selected from a group consisting of:

degreasing the Ag wire with acetone;

washing the Ag wire with deionized water;

mounting the Ag wire in a flexible Polytetrafluoroethylene (PTFE) tube;

filling the flexible Polytetrafluoroethylene (PTFE) tube with epoxy resin;

providing a chloride free electrode as a reference electrode; or providing a platinum wire as a counter electrode in potentiodynamic polarization.

8. The method claim 7, wherein the reference electrode comprises Mercury/Mercurous sulfate ($Hg/Hg_2SO_4$).

9. A method of using a sensor comprising an Ag/AgCl electrode with a polarized surface, wherein the polarized surface comprises a coating comprising a composite organic-inorganic compound, and wherein the composite organic-inorganic compound comprises 2-Mercaptobenzothiazole and a copolymer of perfluoro-3,6-dioxa-4-methyl-7octene-sulfonic acid and tetrafluoroethylene, wherein the polarized surface is blended or capped with one of cellulose acetate, cellulose nitrate, polyurethane, polyvinyl chloride, poly(dimethoxysiloxane) or metal oxides of $RuO_2$, $TiO_2$, $IrO_x$, $Al_2O_3$, or $SnO_2$, and wherein the sensor is doped with Ru or Sn, the method comprising detecting ions.

10. The method of claim 9 wherein the ions are selected from a group consisting of $Cl^-$, $NO_3^-$, $CO_3^{-2}$, $PO_4^{-3}$, $CH_3COO^-$, $SO_4^{-2}$, $ClO_4^-$, and combinations thereof.

11. The method of claim 9 comprising using the sensor to monitor under deposit corrosion.

12. The method of claim 11, wherein the under deposit corrosion is caused by a deposit selected from a group consisting of FeS, $FeS_2$, $SiO_2$, and combinations thereof.

13. The method of claim 9 comprising detecting chloride ions in a concentration ranging from about 0.0001 M to about 1 M.

14. The method of claim 9, wherein a sensor potential decreases systematically with an increasing chloride concentration.

15. The method of claim 9, wherein the sensor is used under a temperature in a range of about 10-300° C.

16. The method of claim 9, wherein the sensor is used under a pressure in a range of about 10-40 bar.

* * * * *